United States Patent [19]
Bracey

[11] 3,710,502
[45] Jan. 16, 1973

[54] LIVE BAIT BUCKET WITH WATER OXYGENATING MEANS

[76] Inventor: Jep T. Bracey, 218 Acacia Street, Lake Jackson, Tex. 77566

[22] Filed: July 13, 1970

[21] Appl. No.: 54,425

[52] U.S. Cl. ..................................................43/56
[51] Int. Cl. ............................................A01k 63/00
[58] Field of Search............................43/57, 56, 55

[56] References Cited

UNITED STATES PATENTS 3,079,954  3/1963  Knapp..................................43/56 X
2,700,243  1/1955  Johnson...................................43/56
3,136,087  6/1964  Scroggins.................................43/57

*Primary Examiner*—Hugh R. Chamblee
*Attorney*—Charles E. Lightfoot

[57] ABSTRACT

A live bait bucket having an outer bucket and an inner perforated bait receptacle removably supported in and closing the bucket and having a hinged cover for sealingly closing the receptacle and provided with a pressure container for oxygen and a valve which may be operated from the exterior of the receptacle to allow oxygen to be introduced from the container into the receptacle to supply oxygen to water therein.

3 Claims, 3 Drawing Figures

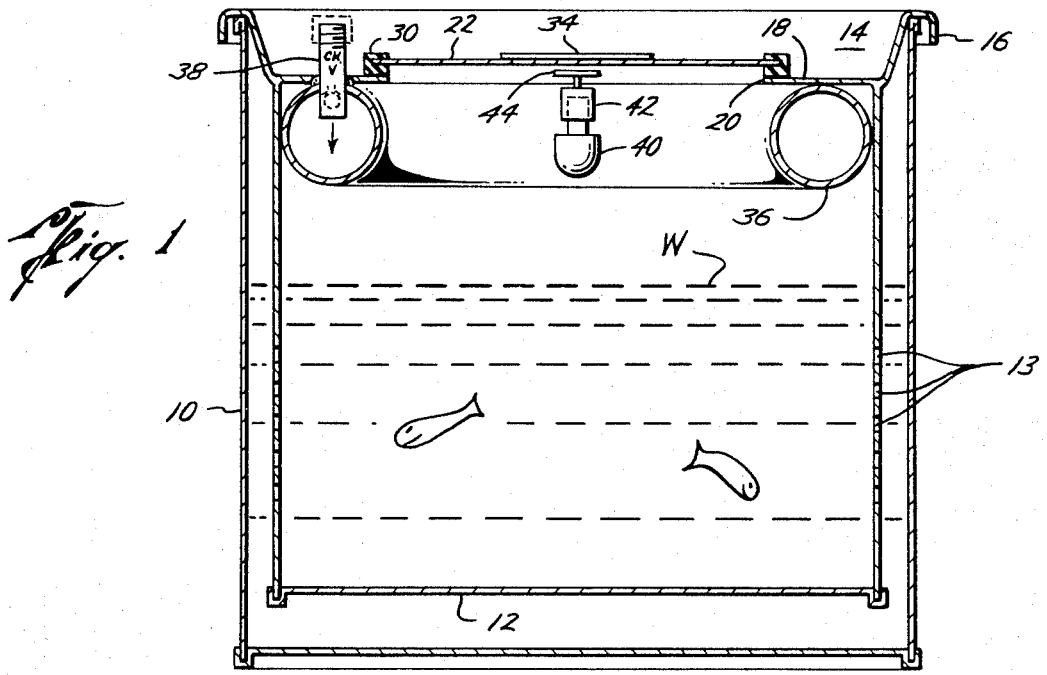
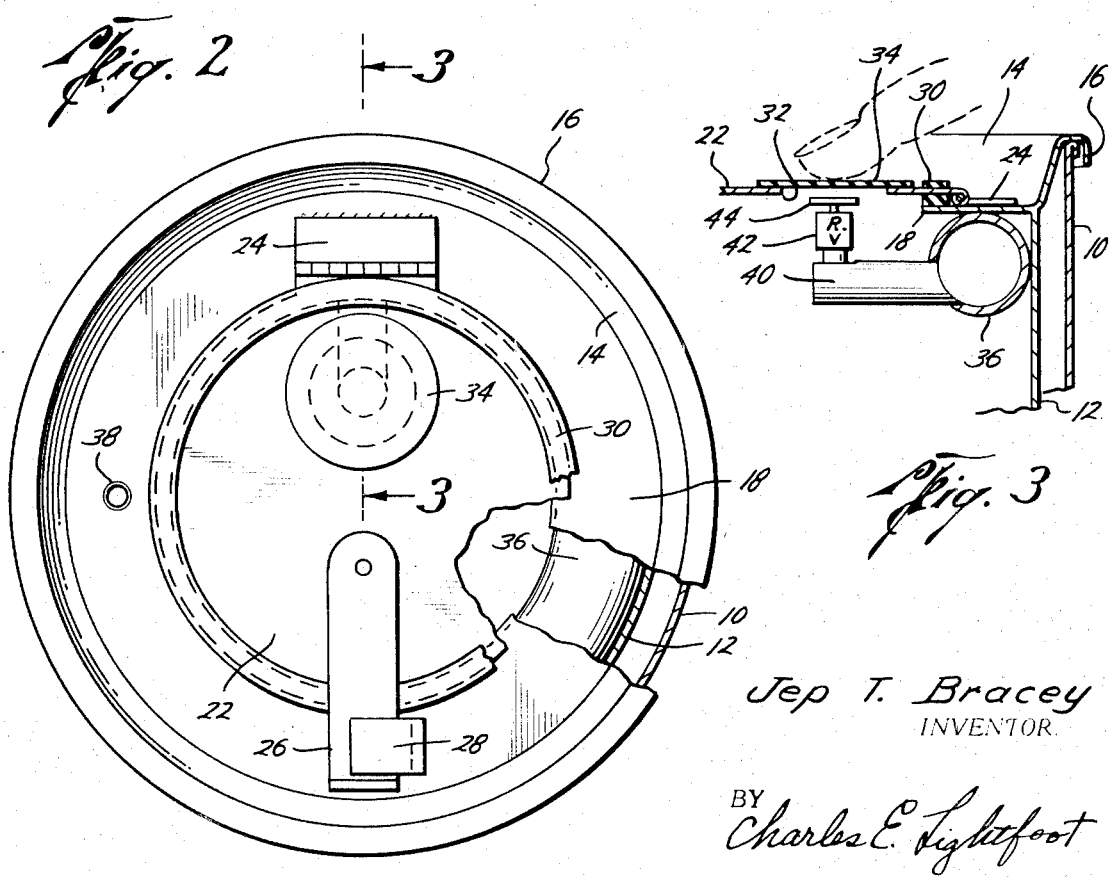

LIVE BAIT BUCKET WITH WATER OXYGENATING MEANS

BACKGROUND OF THE INVENTION

In fishing with live bait it is customary to make use of bait buckets having perforated removable inner bait receptacles in which the live bait is placed to allow the same to be submerged in water in the bucket.

When using such bait buckets, the inner receptacle is sometimes removed from the bucket and placed in the water at the fishing grounds to keep the bait alive and in good condition. During transportation from place to place and between periods of fishing, the inner receptacle is returned to the bucket.

Due to the very limited volume of the water which may be carried in such a bait bucket, the oxygen is soon depleted, so that live bait cannot be kept alive therein for prolonged periods.

Various means have been proposed heretofore for keeping live bait and in good condition in bait buckets of this kind, such as aerating pumps, chemical oxygenating compositions and the like, but such devices have not proven satisfactory due to the difficulty of maintaining the water in a well aerated condition for long periods of time, or the rapid deterioration of chemical compositions used for such purposes and their tendency to leave undesirable residues in the water.

SUMMARY OF THE INVENTION

The live bait bucket of the present invention, briefly described, comprises an outer bucket and an inner, removable, perforated receptacle designed to be supported in the bucket to hold live bait submerged in water in the bucket and which may be sealingly closed to hold oxygen in the receptacle above the water to supply oxygen to the water to keep the bait alive. The inner receptacle carried a pressure container for oxygen which may be supplied with oxygen from the exterior from any suitable source thereof and from which oxygen may be discharged into the receptacle when the same is closed and supported in the bucket, to maintain an atmosphere of oxygen above and in contact with water in the bucket whereby the water may be oxygenated. The outlet from the pressure container into the receptacle is controlled by a valve which may be opened from the exterior without opening the receptacle.

Brief Description Of The Views Of The Drawings

FIG. 1 is a vertical, central, cross-sectional view of a preferred embodiment of the bait bucket of the invention;

FIG. 2 is a top plan view, partly broken away and partly in cross-section, of the invention as illustrated in FIG. 1; and FIG. 3 is a cross-sectional view, taken along the line 3—3 of FIG. 2, looking in the direction indicated by the arrows.

Detailed Description Of A Particular Embodiment Of The Invention

The bait bucket of the invention comprises an outer bucket 10, which is of ordinary construction having an open top, and an inner perforated bucket or receptacle 12, provided with an outwardly and upwardly extending, annular rim 14 which has a downturned, annular, marginal portion shaped to fit over the upper edge of the outer bucket to removably support the inner receptacle thereon with the bottom and side walls of the receptacle in inwardly spaced relation to the bottom and side walls of the outer bucket.

The inner receptacle also has an annular flange portion or upper end wall 18 extending radially inwardly from its side wall about the lower extremity of the rim 14 to give the upper end of the receptacle a dish shape and to provide an upper end opening 20 therein.

A hinged closure 22 is attached to the flange 18 by a hinge 24 to close the opening 20 and which is releasably held in closed position by a suitable latch, such as the pivoted arm 26 which may be extended beneath an angle clip 28 attached to the flange 18.

The closure 22 is provided with an annular seal forming member 30, extending about its peripheral edge, positioned to sealingly engage the flange 18 about the opening 20 when the closure is closed. The closure also has an opening 32 therethrough which is closed by a flexible diaphragm 34.

Within the inner receptacle 12, beneath the flange 18 and surrounding the opening 20 an annular pressure container or tank 36 is suitably supported, as by welding to the surrounding side wall of the receptacle, or to the flange 18, or otherwise, which tank has an inlet pipe 38, extending upwardly through the flange 18, and which is provided with an inwardly opening valve through which the tank may be loaded with oxygen under pressure from any suitable source of supply. The pipe 38 may be provided with a removable screw cap, as shown in dotted lines in FIG. 1.

The tank 36 also has an outlet pipe 40 which is positioned beneath the opening 32 to discharge oxygen under pressure into the interior of the receptacle 12 under the control of a valve 42. The valve 42 is preferably of a usual type which is closed by a spring and which has an operating knob or button 44 which is positioned immediately below the diaphragm 34 to be depressed to open the valve by downward flexing of the diaphragm.

By this arrangement the valve 42 may be opened by depressing the diaphragm 34 with the finger, as seen in FIG. 3, when the closure 22 is closed and sealed, to discharge oxygen from the tank 36 into the interior of the receptacle 12 to be absorbed in the water therein to maintain live bait, such as minnows or shrimp, in live condition.

In making use of the bait bucket of the invention, the inner receptacle 12 may be removed from the outer tucket 10 and place in the water, while fishing, to keep the bait in live condition, and when the bait is to be kept for some time between fishing periods, or at a location where the inner receptacle may not be submerged, the inner receptacle may be replaced in the outer bucket, which has been supplied with water, and oxygen admitted into the inner receptacle to keep the bait in good condition. By suitably pressurizing the tank 36 with oxygen a supply of oxygen may be conveniently maintained which may be furnished from time to time to the interior of the receptacle to maintain the water therein in an oxygenated condition.

It will be noted that the perforations 13 of the inner receptacle 12 are all located to be below the level of the water W which is maintained in the outer bucket, as shown in FIG. 1, so that oxygen introduced into the receptacle from the tank 36 when the receptacle is in the bucket will be trapped above the water in the receptacle and maintained in contact therewith to be dissolved in the water.

What is claimed as new and desired to secure by Letters Patent is:

1. A live bait bucket comprising:
   an outer bucket;
   an inner perforated receptacle removably supported in the bucket, whose perforations are located to be positioned below the level of water therein and having an upper end opening;
   closure means scalingly engagable with the receptacle to close said opening;
   a pressure container carried by said receptacle;
   means for introducing oxygen into said container from a pressure source;
   said container having an outlet through which oxygen may flow from the container into said receptacle above the level of water therein when the receptacle is in the outer bucket;
   valve means connected from said container to said outlet and operable from the exterior of said receptacle to flow oxygen through said outlet, said valve means including
   a valve element; and,
   a movable element carried by said closure means for coaction with said valve means to manipulate said valve means on movement of said element in a predetermined direction.

2. The bait bucket of claim 1 wherein said closure means has an opening therein, and a flexible diaphram closes said opening, and said valve means is opened on flexure of said diaphram.

3. The bait bucket of claim 1 wherein said container encircles the upper end of said receptacle.

\* \* \* \* \*